UNITED STATES PATENT OFFICE.

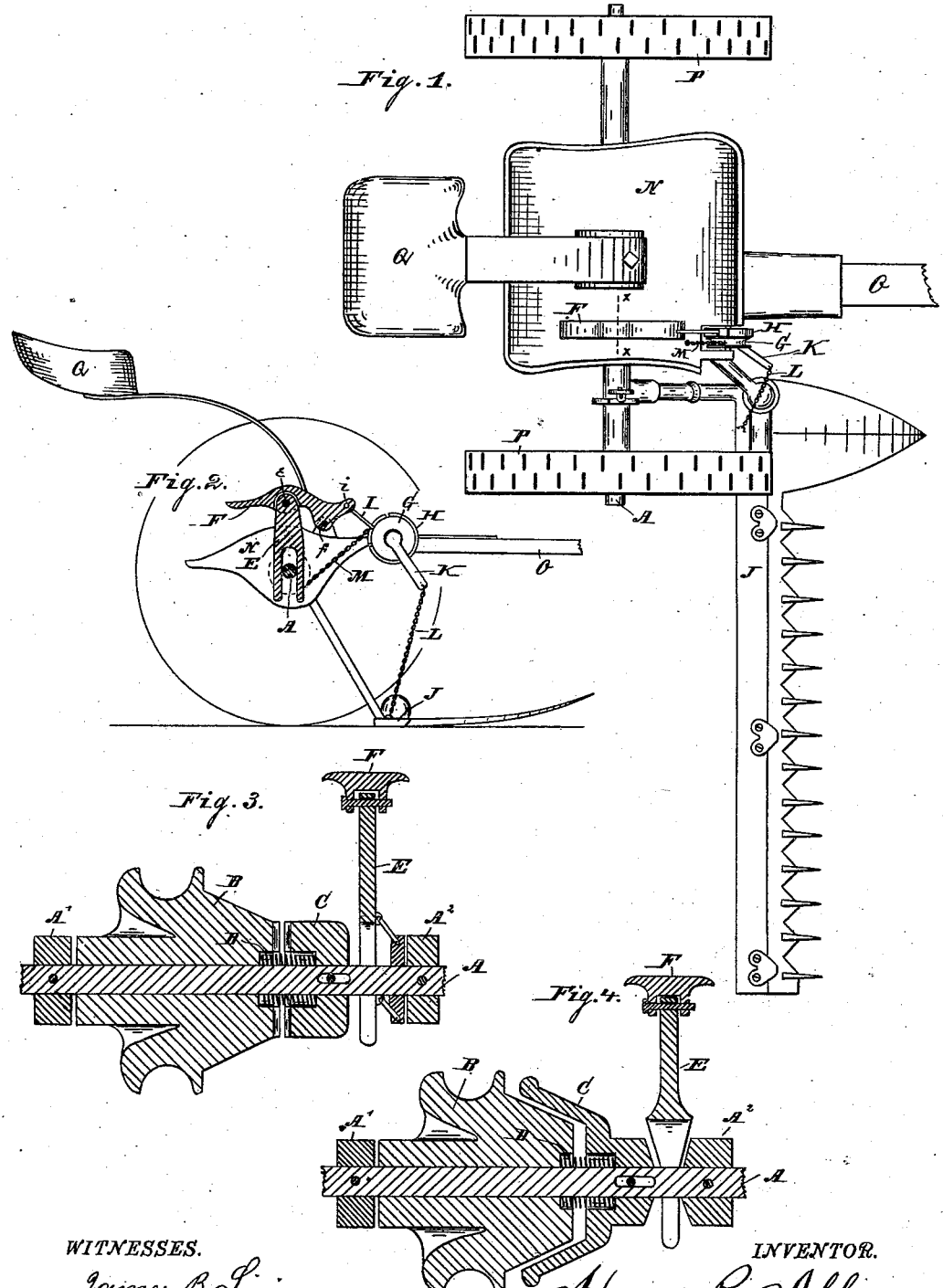

HORACE R. ALLEN, OF INDIANAPOLIS, INDIANA.

CUTTER-BAR LIFTER FOR MOWING-MACHINES.

SPECIFICATION forming part of Letters Patent No. 260,351, dated July 4, 1882.

Application filed July 29, 1881. (No model.)

*To all whom it may concern:*

Be it known that I, HORACE R. ALLEN, of the city of Indianapolis, county of Marion, and State of Indiana, have invented certain new and useful Improvements in Cutter-Bar Lifters for Mowing-Machines, of which the following is a specification.

The object of my said invention is to raise the cutter-bars of mowing or reaping machines by power from the machine itself, instead of by the common hand-lever, as has been usual. This object is accomplished by attaching appropriate clutch mechanism to the axle or some other revolving part of the machine, which, when thrown into gear, shall operate through a chain or equivalent device upon said cutter-bar, as will hereinafter be more specifically set forth.

Referring to the accompanying drawings, which are made a part hereof, and on which similar letters of reference indicate similar parts, Figure 1 is a top or plan view of a machine wherein my invention is employed; Fig. 2, a vertical section thereof; Fig. 3, a vertical detail section on the dotted line $x\ x$; and Fig. 4, a similar view to Fig. 3, but showing a somewhat different construction of the clutch mechanism.

In said drawings, the portions marked A represent the axle of the machine; B, a sheave or pulley running loosely thereon, one side of which is formed to constitute one half of a clutch; C, a casting mounted so as move longitudinally along the axle, but secured so as to revolve therewith, and which is formed to serve as the other half of the clutch; D, a spring, which serves to keep the part C from the part B until force is applied to bring them in contact; E, a shifting device, preferably sitting astride the axle, and adapted to force the part C into engagement with the part B; F, a foot-lever pivoted to the device E by the pivot $e$ and to a portion of the frame-work of the machine by a pivot, $f$, by which said device E may be forced downwardly to operate on the movable portion C of the clutch; G, a pulley mounted in front of the pulley B on the frame-work or tongue of the machine; H, a notched disk, which is preferably alongside the pulley G, and constructed rigidly therewith; I, a latch pivoted to the lever F by the pivot $i$, and adapted to engage with the notched disk H; J, the cutter-bar of the machine; K, a projecting arm on the wheel G; L, a chain connecting the arm K and the heel of the cutter-bar; M, a chain connecting the pulleys B and G; N, an iron casting, forming in the machine shown the frame-work thereof; O, the tongue of the machine; P, the wheels, and Q the seat thereof.

The operation of my said invention is as follows: When the operator desires to raise the cutter-bar, instead of lifting it by a hand-lever, as has been customary, he simply presses upon the rear end of the lever F with his foot. This, by a single operation, both releases the pulley G by withdrawing the latch I from engagement with the notched disk H and throws the clutch B C into engagement by forcing the device E down between the part C and the collar $A^2$, thus pushing said part C into contact with the part B and causing the latter to revolve. The pulley or sheave portion of the part B, when rotated, winds up the chain M, and through the pulley G, arm K, and chain L raises the cutter-bar J to such height as may be desired. When the cutter-bar reaches the proper position the foot-pressure on the lever F is relieved. The latch I immediately re-engages with the disk H, thus holding the cutter-bar in the position to which it has been brought, while the spring D, simultaneously with this operation, causes the parts B and C to part contact, thus stopping the movement of the part B and of the devices to which motion is imparted thereby. When it is desired to lower the cutter-bar the foot-lever F is again pressed upon, but not so firmly as before, thus withdrawing the latch I without bringing the parts B C into contact, and the cutter-bar falls into position by its own weight. Its fall may be retarded to any degree desired by bringing the parts B C into slight contact, not firm enough, however, to cause the former to revolve with the latter, and thus lift the cutter-bar.

In Fig. 3 the shifter E is shown mounted in such a manner as to be forced sidewise toward the part C when pushed downwardly and away from it when raised up, and the clutch parts are shown as having notched or serrated faces. In Fig. 4 the shifter E is shown as being wedge-shaped and adapted to operate the clutch by being forced down into the space between the part C and the collar A², thus forcing the part C sidewise, and the clutch parts are shown of a form adapted to maintain its relation to the part B solely by frictional contact. In both figures the shifter E is shown in bifurcated form and astride the axle, which is the preferable position, for the reason that it can then bear with equal force against the clutch, upon both sides thereof.

Having thus fully described my said invention, what I claim as new, and desire to secure by Letters Patent, is—

1. The combination, in a mowing or reaping machine, of the axle thereto, a pulley thereon, having one side fitted to operate as a clutch part, a second clutch part upon the same shaft, which is operated to engage with the first by the vertically-moving shifter E, the cutter-bar, and means, substantially as described, whereby said pulley and said cutter-bar are connected, and when the pulley is rotated the cutter-bar may be lifted, substantially as shown and specified.

2. The combination, in a mowing or reaping machine, of the lever F, shifter E, clutch parts C, pulley B, chain M, pulley G, arm K, chain L, and cutter-bar J, substantially as and for the purposes set forth.

3. The combination, in a mowing or reaping machine, with a device for raising the cutter-bar by power from the machine, of the foot-lever F, which also operates the engaging-clutch of said device, the rod or catch I, operated by said lever, and the notched disk H, with which said rod or latch engages, substantially as shown and described, and for the purposes specified.

In witness whereof I have hereunto set my hand and seal, at Indianapolis, Indiana, this 26th day of July, A. D. 1881.

HORACE R. ALLEN. [L. S.]

In presence of—
C. BRADFORD,
S. C. CRANE.